US006196082B1

(12) United States Patent
Iwata

(10) Patent No.: US 6,196,082 B1
(45) Date of Patent: Mar. 6, 2001

(54) HAND LEVER DEVICE

(75) Inventor: Hitoshi Iwata, Tokyo (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 09/496,746

(22) Filed: Feb. 3, 2000

(30) Foreign Application Priority Data

Feb. 9, 1999 (JP) ........................................ 11-031022

(51) Int. Cl.[7] ........................................ F16C 1/12
(52) U.S. Cl. ........................................ 74/501.6; 30/276
(58) Field of Search ........................................ 74/501.6, 502.2, 74/489, 500.5; 30/276

(56) References Cited

U.S. PATENT DOCUMENTS

| | | | | |
|---|---|---|---|---|
| 5,664,543 | * | 9/1997 | Taomo et al. | 74/501.6 X |
| 5,685,271 | * | 11/1997 | Taomo et al. | 74/500.5 X |
| 5,758,546 | * | 6/1998 | Taomo et al. | 74/501.6 |
| 5,865,155 | * | 2/1999 | Nagashima | 74/500.5 X |
| 5,916,331 | * | 6/1999 | Nagashima . | |

FOREIGN PATENT DOCUMENTS

| | | |
|---|---|---|
| 57-19944 | 4/1982 | (JP) . |
| 1035318 | 2/1998 | (JP) . |

* cited by examiner

*Primary Examiner*—MaryAnn Green
(74) *Attorney, Agent, or Firm*—Baker Botts L.L.P.

(57) ABSTRACT

A hand lever device for operating a driven member includes a main lever arranged to be pivoted about a first rotational axis, a sub-lever arranged to be pivoted about a second rotational axis and retained in a stationary state at a set pivoted position, a returning member arranged to be rotated about a third rotational axis, and a cable coupled at one end to the driven member and linked at the other end with the main lever and the returning member. When the main lever is pivoted to a set position, it rotates the returning member about the third rotational axis and removes slack from the cable. Pivoting of the sub-lever further rotates the returning member about the third rotational axis to a selected operating position. An accelerating subsidiary lever that is also pivoted about the first rotational axis further pulls, via the returning member, the cable, thereby to further move the driven member.

7 Claims, 12 Drawing Sheets

HAND LEVER DEVICE

BACKGROUND OF THE INVENTION

The present invention relates to a hand lever device for manipulating, through a cable, a driven member (a member to be driven) such as a carburetor throttle valve for an internal combustion engine and, in particular, to a hand lever device which is suited for use in a working machine such as a hedge trimmer, bush cutter, etc., and is adapted to be attached close to the grip portion of the handle of the working machine for opening or closing, through a throttle cable, the carburetor throttle valve.

In the case of a working machine such as a hedge trimmer, bush cutter, etc. where a working member thereof such as a cutting blade is arranged to be driven by means of an internal combustion engine, a hand lever for adjusting the opening degree of carburetor throttle valve of the internal combustion engine is usually disposed close to the grip portion of a U-shaped handle or a bar handle of the working machine so as to allow the output of the internal combustion engine to be controlled at hand.

The hand lever device is usually provided with a throttle trigger (throttle lever) that can be manipulated by an operator's finger, thereby enabling the operator to adjust, through a throttle cable, the opening degree of the carburetor throttle valve by pivotally moving the throttle lever. The carburetor throttle valve is generally urged in a direction such as to always set a minimum opening degree at which the carburetor throttle valve is always kept to an opening degree for an idling speed of the engine when the working member is not in an operating state. However, when the throttle cable is pulled to an extent exceeding a predetermined amount beyond the play thereof, the carburetor throttle valve is caused to further open, starting from the idling opening degree toward a setting for a higher engine speed greater than the idling speed.

There are known two types of hand lever devices for adjusting the opening degree of the carburetor throttle valve; i.e., an idling opening degree-automatic reset type (automatic reset type) wherein the hand lever is enabled automatically to return together with the carburetor throttle valve to the original position (idling opening degree) as soon as the throttle lever is released from a position held by the operator's finger and a retention type wherein the throttle lever can be always kept in a stationary state at any desired angle position once the throttle lever is pivotally moved to the desired angle even if the operator releases the throttle lever (Japanese Utility Model Publication S57-19944).

It is possible, according to the aforementioned automatic reset type hand lever, to allow an internal combustion engine to automatically return to an idling engine speed as soon as the throttle lever is released from the operator's finger, thereby cutting off a centrifugal clutch and hence suspending the power transmission of the engine to the working member if the working machine is arranged such that the power transmission of engine to the working member (such as a cutting blade) is to be effected through the centrifugal clutch. Therefore, it is possible, according to the aforementioned automatic reset type hand lever, to immediately cause the carburetor throttle valve to return to the idling opening degree so as to suspend the operation of the working member as soon as any unexpected situation is encountered, thereby advantageously improving the safety of operation. The automatic reset type hand lever is, however, accompanied by the problem that if the carburetor throttle valve is to be maintained at any desired opening degree, the throttle lever has to be always held by the operator's finger in order to maintain the rotated position of the throttle lever, thereby making it inconvenient to manipulate the throttle lever at an intermediate opening degree, causing the operator's finger to become fatigued, and making it difficult for the operator to avoid fluctuation of the position of the lever and thus variation of the engine speed.

As far as the manipulability of the working machine is concerned, it is generally preferable that a manipulating lever to be rotationally manipulated with an operator's finger be arranged to take only two rotational positions, i.e., a released position and a set position (gripped position) without enabling the manipulating lever to take an intermediate opening position. Namely, it is preferable in terms of manipulability to arrange the throttle lever so that it takes the same manipulated rotational position (the set position), irrespective of the opening degree of the carburetor throttle valve, i.e., either an intermediate opening degree (a partial opening degree) or a full opening degree (WOT).

On the other hand, in the case of the aforementioned retention type, it is possible to overcome the aforementioned problems of the automatic reset type hand lever, thus enabling the throttle lever to be always kept in a stationary state at any desired angle position even if the throttle lever is released free from the operator's finger. As a result, the operator's finger can be rendered free from the gripping of the throttle lever, thus facilitating the operation of the working machine. However, it is required, if any unexpected situation is generated, to take an additional manipulation to release the throttle lever position-retaining function, so that it is impossible to immediately suspend the operation of the working member. Namely, the aforementioned retention type is accompanied with a problem that it is inferior in terms of the safety of operation as compared with the aforementioned automatic reset type hand lever.

If it is required, in order to restore the working mode of the machine in either the automatic reset type or the retention type, to return the throttle valve to the previous opening degree of the throttle valve after the throttle lever has been once returned to the initial idling position for interrupting the working (that kind of manipulation is frequently experienced in the case of a working machine such as a bush cutter), the manipulating rotational position of the throttle lever is required to be readjusted, which involves a troublesome manipulation of the throttle lever, thus leaving room for improvement in terms of manipulability of the working machine.

With a view to overcome these problems involved in the aforementioned hand lever devices, the present assignee has already proposed a hand lever device, as set forth in Japanese Patent Unexamined Publication H8-303262, wherein the hand lever device comprises a main lever and a sub-lever which are enabled to pivot and arranged such that the sub-lever functions to pull a cable connected with a driven member via a returning member such as a running block, and the main lever functions to move the returning member.

With such a hand lever device, various advantages can be obtained. For example, the opening degree of the driven member such as a carburetor throttle valve can be easily adjusted and maintained to a desired opening degree via the cable, and also can be quickly returned to the minimum opening degree (idling opening degree), thus assuring a high operational safety and minimizing the weariness of the operator's finger. Additionally, it is possible to dispense with the readjustment of the throttle lever at the time of returning the carburetor throttle valve to the previous opening degree.

However, the hand lever device as proposed previously by the present assignee is still accompanied with the following problems in terms of manipulability.

Namely, the hand lever device cannot be said to be excellent in its ability to restore the previous engine speed when the main lever is pivotally moved to a pre-set position in order to cause the throttle valve to return to the previous intermediate opening degree, after a carburetor throttle valve has been once returned to the idling opening degree by releasing the main lever during the operation of a working machine such as a bush-cutting operation with the engine being conditioned to a partial engine speed region, i.e., the main lever being moved to the set position and the sub-lever being maintained at an intermediate opening degree (adjusted opening degree). In other words, it takes a relatively long time to regain the previous engine speed once the main lever is returned to the idling opening degree as mentioned above.

Further, when the cutting blade of a bush cutter becomes entangled with a weed or is called upon to cut dense or thick weeds during the operation of a bush cutter with the engine speed thereof adjusted to a partial engine speed region, the load on the engine would be greatly increased, thereby greatly decreasing the engine speed and thus retarding the cutting work. In such a case, in order to remove a tangled weed from the cutting blade or to allow the cutting blade to pass through dense or thick weeds, the sub-lever may be further pivotally moved to enlarge the opening degree of the throttle valve so as to temporarily increase the engine speed, after which the sub-lever is returned to the previous opening degree. However, since the sub-lever is generally disposed forwardly relative to the main lever (the grip portion for grasping the main lever) so as to allow the sub-lever to be manipulated with the operator's thumb and since the sub-lever is arranged to be retained at a pivoted position, it is not only troublesome to frequently adjust the opening degree thereof, but also annoying in taking time for adjusting the opening degree thereof, thus making the hand lever device disadvantageous in terms of operability. Therefore, there is a need to develop measures which enable the engine speed to be quickly increased with a simple manipulation when the engine speed is caused to decrease as described above.

BRIEF SUMMARY OF THE INVENTION

The present invention has been made in response to the aforementioned need, and therefore an object of the present invention is to provide a hand lever device which enables the opening degree of the driven member such as a carburetor throttle valve to be easily adjusted and maintained to a desired opening degree via the cable, and also to be quickly returned to the minimum opening degree (idling opening degree), thus assuring a high operational safety and minimizing the weariness of an operator's finger, and additionally, which makes it possible to dispense with the readjustment of the throttle lever at the occasion of returning the carburetor throttle valve to the previous opening degree. An additional object of the present invention is to provide a hand lever device which is not only excellent in its responsiveness in regaining the previous engine speed but also capable of quickly increasing the engine speed with a simple manipulation even when the engine speed is caused to decrease.

With a view to realize the aforementioned objects, a hand lever device according to the present invention is characterized in that it basically comprises a main lever adapted to be pivotally manipulated about a first rotational axis, a sub-lever adapted to be pivotally manipulated about a second rotational axis and to be retained in a stationary state at a selected pivoted position, a returning member adapted to be rotated about a third rotational axis, and a driven member controlling-cable which is linked with said main lever and with said returning member. The cable is arranged to be pulled by a pivotal manipulation of the main lever to a set position and to thereby rotate the returning member about the third rotational axis and also arranged to be further pulled out from the above-mentioned pulled state by a pivotal manipulation of the sub-lever to further rotate the returning member about the third rotational axis.

The hand lever device according to the present invention is further characterized in that it includes an accelerating subsidiary lever, which is adapted to be pivotally manipulated about the first rotational axis so as to further pull, via the returning member, the cable under a condition where the main lever is pivotally moved to the set position and the sub-lever is retained at an intermediate opening degree.

In a preferred embodiment of the present invention, as the main lever is pivotally moved to the set position, the accelerating subsidiary lever is also caused to pivotally move together with the movement of the main lever.

A typical but not the sole end-use for the hand lever according to the present invention is for the adjustment of the opening degree of the carburetor throttle valve of an internal combustion engine.

According to a preferred embodiment of the hand lever of the present invention, which is constructed as described above, when the main lever is pivotally manipulated from the released state thereof up to a predetermined angle (a preset angle) or to a predetermined set position which is close to the grip portion of the handle, the cable (throttle cable) which is linked to a driven member such as the carburetor throttle valve is pulled by a predetermined distance, thus leaving little play to the cable.

Then, when the sub-lever is pivoted by a desired angle from the initial position under the condition where the main lever is kept retained in the set position thereof, i.e., the throttle cable is sufficiently pulled to leave little play or slack in the throttle cable, the throttle cable is further pulled by a predetermined distance by the returning member, thereby causing the carburetor throttle valve to further open from the minimum opening degree (idling opening degree), thus adjusting the opening degree of the carburetor throttle valve.

Even if the sub-lever is released from engagement by the operator's finger after the aforementioned manipulation, the sub-lever can be left retained in a stationary state at the pivoted position, and hence the carburetor throttle valve is also held at the adjusted opening degree (preset opening degree), thus alleviating the burden on the operator's finger.

The magnitude of pulling of the throttle cable by way of the main lever should be adjusted such that it is almost the same as or slightly larger than the maximum magnitude of pulling of the throttle cable by the sub-lever.

If it is desired to greatly reduce the engine speed as quickly as possible due to an unexpected situation, for instance under the condition where the opening degree of carburetor throttle valve is adjusted to a desired opening degree, the operator releases the main lever. As a result, since the throttle cable is always urged to move the throttle valve toward the valve-closing direction, the throttle cable is caused to return to the aforementioned non-operating condition, thus allowing the carburetor throttle valve to return to the idling opening degree and reducing the speed of the internal combustion engine to idling.

If the working device is of the type where the power transmission of the internal combustion engine to the working member (such as a cutting blade) is to be effected through a centrifugal clutch, the centrifugal clutch would be immediately turned into a cut-off state, thus suspending the power transmission of the engine to the working member and hence stopping the movement of the working member.

When the main lever is pivoted to a predetermined set position which is close to the grip portion of the handle after the main lever has been once released from the operator's finger as described above, the throttle cable is pulled by a predetermined distance, thus leaving little play to the cable, and at the same time, the carburetor throttle valve is allowed to return to the previous opening degree which has been set prior to the release of the main lever, thus dispensing with the re-adjustment of the sub-lever, since the sub-lever can be kept retained at the previous position during the manipulation.

As described above, it is possible with the handle lever device of the present invention to enable the opening degree of the driven member such as a carburetor throttle valve to be easily adjusted and maintained to a desired opening degree via the cable, and also to be quickly returned to the minimum opening degree (idling opening degree), thus assuring a high operational safety and minimizing the weariness of the operator's finger. Additionally, it is also possible with the handle lever device of the present invention to dispense with the readjustment of the throttle lever when returning the carburetor throttle valve to the previous opening degree.

When the main lever is pivotally moved to a pre-set position after a carburetor throttle valve has been once returned to the idling opening degree by releasing the main lever during the operation of a working machine such as a bush-cutting operation with the engine being set to a partial engine speed region, i.e., the main lever being moved to the set position and the sub-lever being maintained at an intermediate opening degree (adjusted opening degree), the throttle valve can be returned to the previous adjusted opening degree. However, it takes a relatively long time in regaining the previous engine speed (pre-set engine speed), once the main lever is returned to the idling opening degree as mentioned above. In order to solve that problem, the hand lever device according to the present invention is arranged such that concurrently with the manipulation of the main lever to return it to the previous set position, the accelerating subsidiary lever that has been rotated together with the rotation of the main lever can be further rotated up to the set position or close to the grip portion (by grasping the accelerating subsidiary lever so as to lift it). As a result, the throttle cable is further pulled via the returning member, thereby causing the opening degree of the throttle valve to become further enlarged as compared with that produced by moving the main lever to the set position to attain a pre-set engine speed, and due to the enlarged opening degree of the throttle valve, the engine speed can be quickly increased. Subsequently, the accelerating subsidiary lever is released from the operator's finger, thereby allowing the accelerating subsidiary lever to return to the initial position which has been pre-set before the manipulation thereof, since the throttle cable is always urged in the direction to close the carburetor throttle valve. As a result, the increased engine speed can be returned, within a very short period of time, to the ordinary engine speed corresponding to the adjusted opening degree of the sub-lever, the ordinary engine speed being maintained thereafter.

As explained above, due to the provision of the accelerating subsidiary lever, the responsiveness of the engine to manipulations of the hand lever device and the ease of use of the hand lever device by an operator can be improved.

Further, when the cutting blade of a bush cutter becomes entangled with a weed or encounters an area of dense or thick weeds and the bush cutter is operating with the engine speed adjusted to a partial engine speed region, the load on the engine would be greatly increased, thereby greatly decreasing the engine speed and slowing the cutting work. In such a case also, with the main lever being kept retained at the previous set position, the accelerating subsidiary lever is further rotated up to the set position or close to the grip portion (by grasping the accelerating subsidiary lever so as to lift it). As a result, the throttle cable is further pulled via the returning member, thereby causing the opening degree of the throttle valve to become further enlarged, and due to the enlarged opening degree of the throttle valve, the engine speed (torque) can be quickly increased, thus making it possible to smoothly proceed with the bush-cutting operation. When the cutting blade is released from the aforementioned entanglement with a weed or from the crowded weed area, the accelerating subsidiary lever can be released from the operator's finger, thereby allowing the accelerating subsidiary lever to return to the initial position which has been pre-set before the manipulation thereof, and hence allowing the increased engine speed to immediately return to the ordinary engine speed corresponding to the adjusted opening degree of the sub-lever, the ordinary engine speed being maintained thereafter.

As explained above, due to the provision of the accelerating subsidiary lever in the device of the present invention, the engine speed can be quickly increased by way of simple manipulation even if the engine speed is caused to be temporarily decreased.

According to a further preferred embodiment of the hand lever device of the present invention, when the accelerating subsidiary lever is pivoted up to the set position, the accelerating subsidiary lever can be locked (a partial lock) with the throttle cable being pulled to a predetermined extent, and the locked state can be unlocked by pivoting the main lever up to the set position.

In another embodiment of the present invention, one end face of the boss portion of the main lever is in engagement with one end face of the boss portion of the accelerating subsidiary lever, and at least one of the end faces is provided with a cam face. Accordingly, when the accelerating subsidiary lever is pivoted up to the set position, the boss portion thereof is caused to shift outward, thereby causing the other end face to be press-contacted with a case member, thus giving rise to a frictional force between the aforementioned other end face and the case member. Due to the frictional force, the accelerating subsidiary lever is clamped and held in the aforementioned locked state.

As explained above, since the hand lever device of the present invention is provided with the partial lock property that can be effected through the pivotal manipulation of the accelerating subsidiary lever, the start up ability of the engine can be improved.

DESCRIPTION OF THE DRAWINGS

For a more complete understanding of the present invention, and the advantages thereof, reference may be made to the following description of an exemplary embodiment, taken in conjunction with the accompanying drawings.

DESCRIPTION OF THE EMBODIMENT

The present invention will be further explained with reference to the drawings depicting various embodiments of the present invention.

Figure 1:
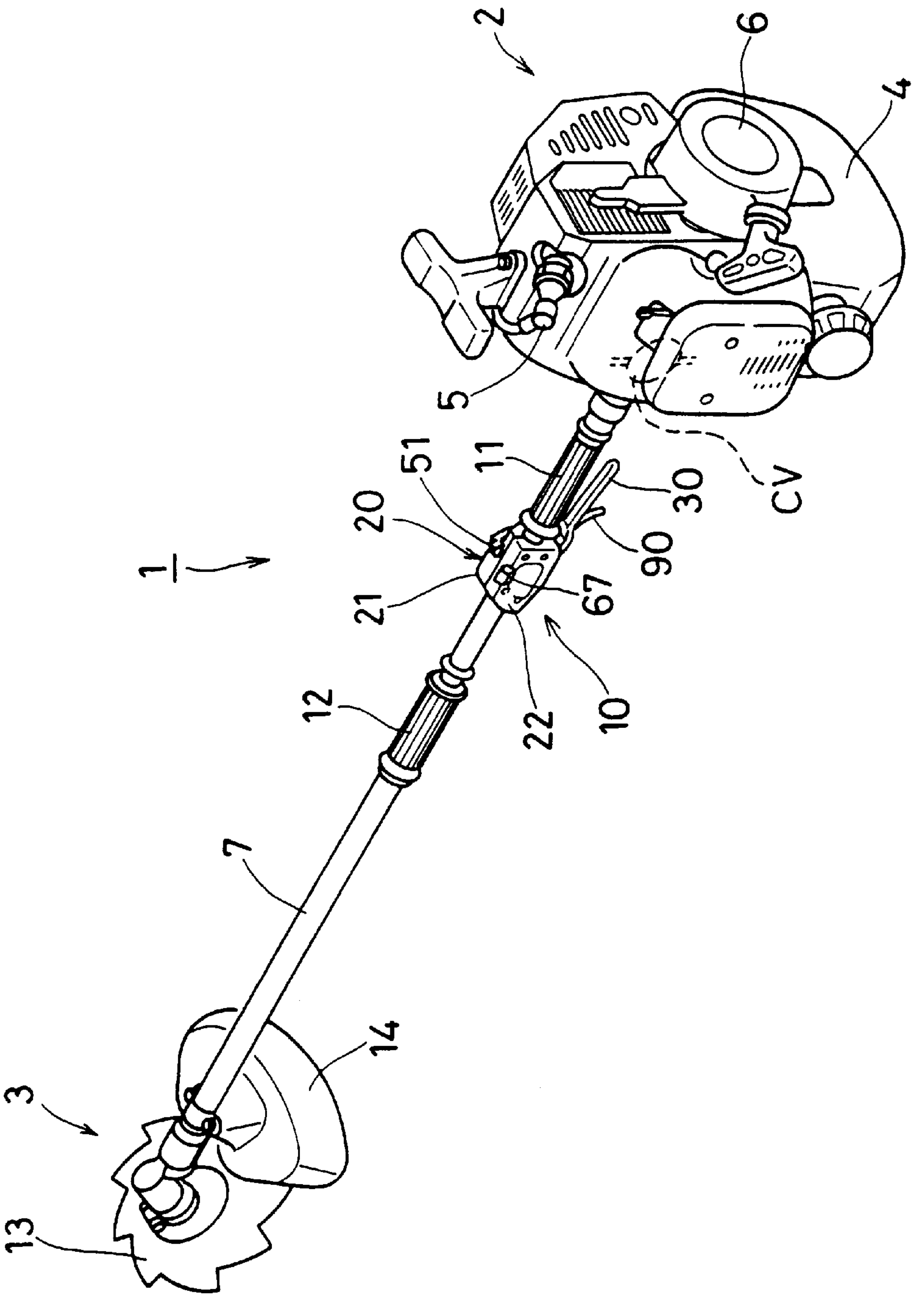
FIG. 1 is a perspective view illustrating one example of a bush-cutter in which an embodiment of the hand lever device according to the present invention is employed.

FIG. 1 shows one example of a bush-cutter in which an embodiment of the hand lever device according to the present invention is employed. The bush-cutter 1 comprises a pipe-like bar handle (operating handle) 7 provided with a pair of grip portions 11 and 12 which are spaced apart from each other, a working portion 3 attached to the distal end portion of the bar handle 7 and composed of a cutting blade 13 and a safety cover 14, and an internal combustion engine (a small size air-cooled two-stroke gasoline engine) 2 attached to the proximal end portion of the bar handle 7. The engine 2 serves as a power source for actuating the cutting blade 13 through a drive shaft 8 received in the bar handle 7 (see FIGS. 6 and 7) and includes a recoil starter 6, a fuel tank 4, a carburetor throttle valve CV and an ignition plug 5.

In the embodiment, the carburetor throttle valve CV is arranged such that it is always urged in a direction to assume a minimum (idling) opening degree and such that it can be further opened starting from the minimum opening degree by means of a throttle cable (an inner cable to be explained later) 17 (FIG. 5) linked with the throttle valve CV. More specifically, as the throttle cable 17 is pulled more than a predetermined distance from the un-manipulated state thereof, the slack in the throttle cable 17 is taken up and the carburetor throttle valve CV begins to be further opened by the pulling of the throttle cable 17.

The hand lever device 10 according to the embodiment for adjusting the opening degree of the carburetor throttle valve CV is attached close to the grip portion 11, which is the rearward one of the two grip portions 11 and 12 and is generally grasped by the operator's right hand.

Figure 2:
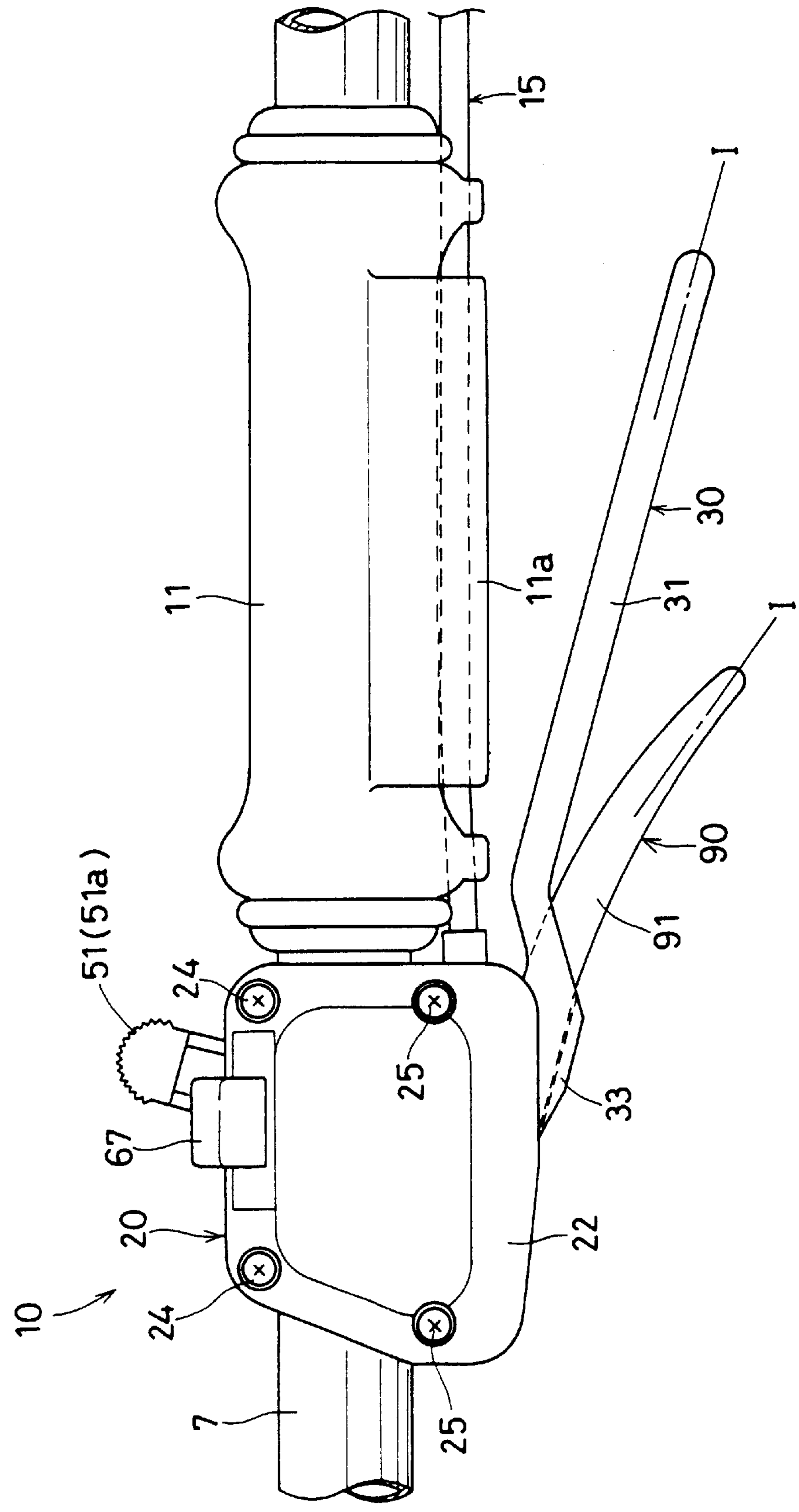
FIG. 2 is an enlarged left side view showing one embodiment of the hand lever device according to the present invention.
Figure 3:
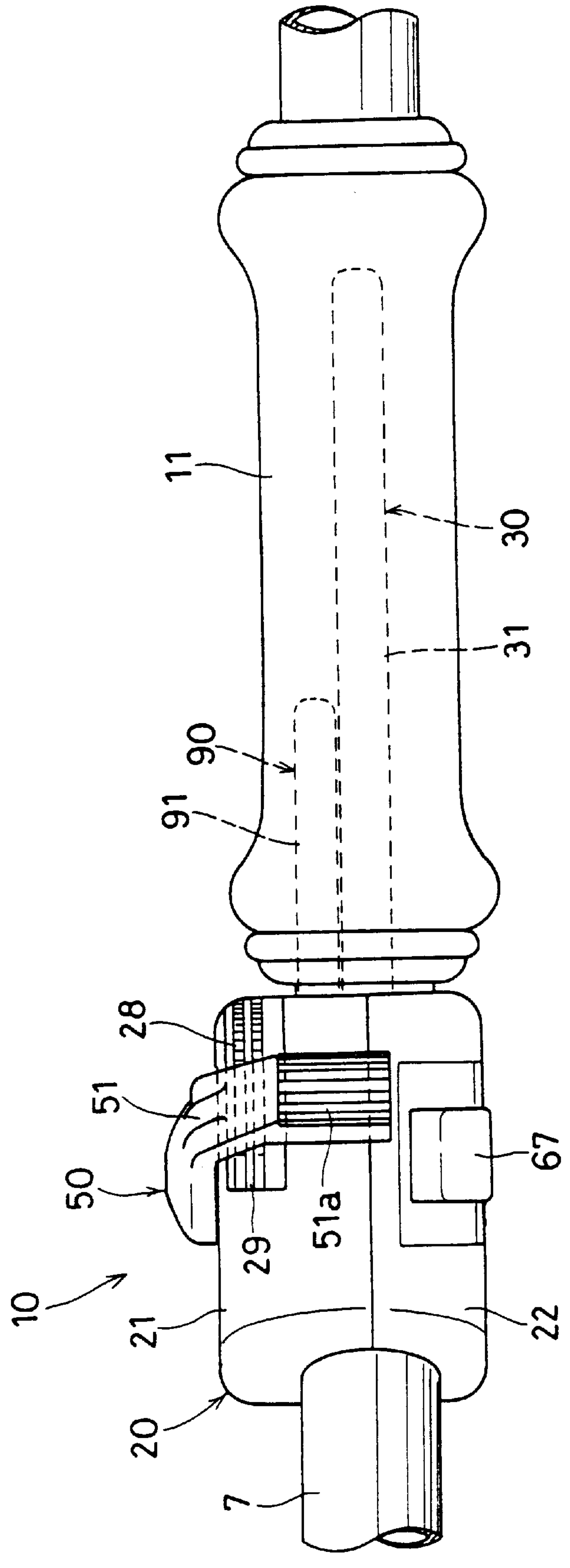
FIG. 3 is a plan view showing one embodiment of the hand lever device according to the present invention.
Figure 4:
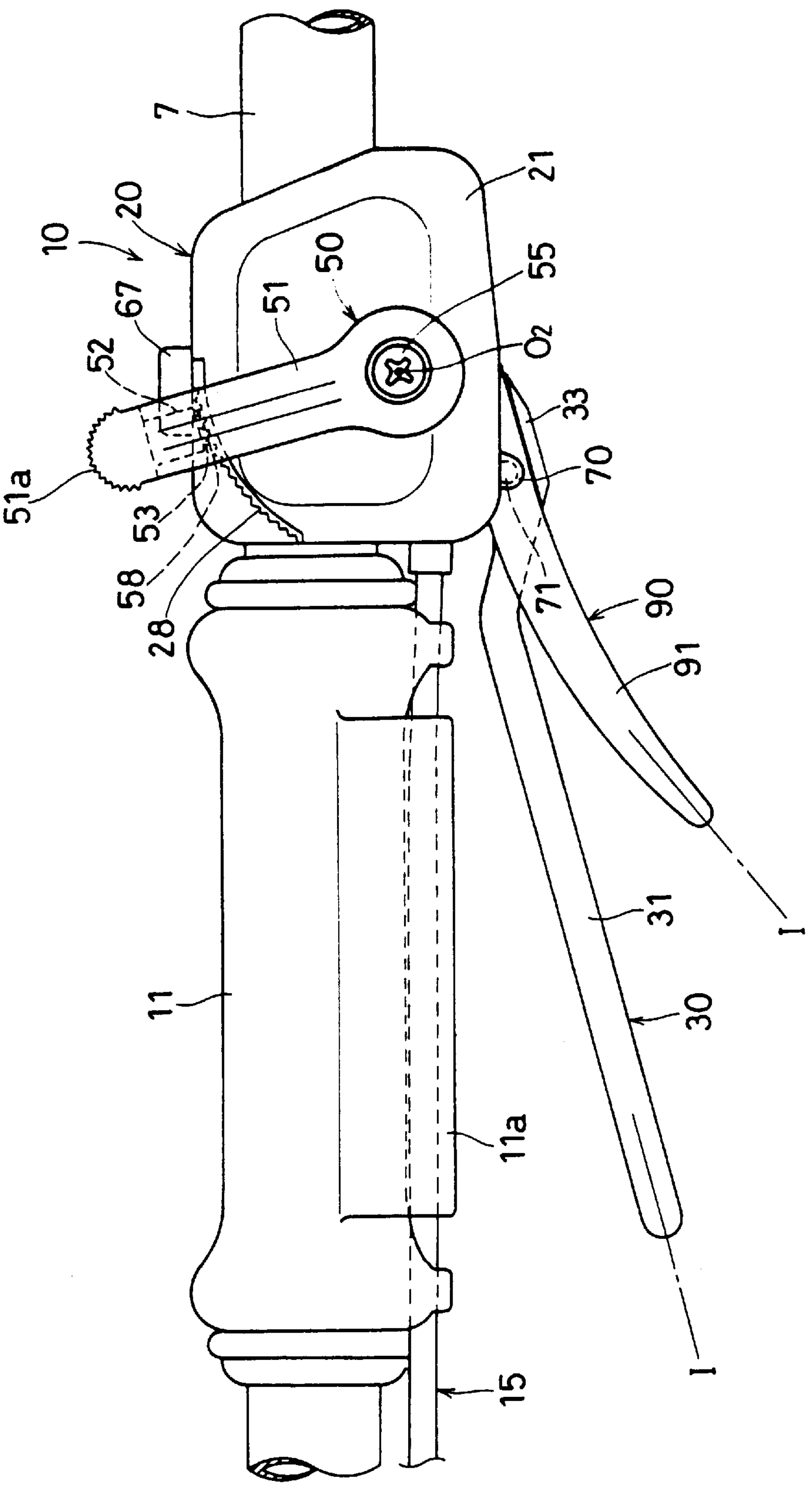
FIG. 4 is an enlarged right side view showing one embodiment of the hand lever device according to the present invention.

As may be seen in FIGS. 2 to 4, the hand lever device 10 comprises a case member 20 which is fitted over and fixed to a portion of the bar handle 7 which is close to the rearward grip portion 11. To the case member 20 are rotatably attached a main lever 30 and an accelerating subsidiary lever 90 (both to be explained in detail hereinafter), which are arranged to pull the throttle cable 17 that is received in the outer tube or sheathe 16 of a Bowden cable 15 and is linked to the carburetor throttle valve CV (see FIG. 5).

Figure 6:
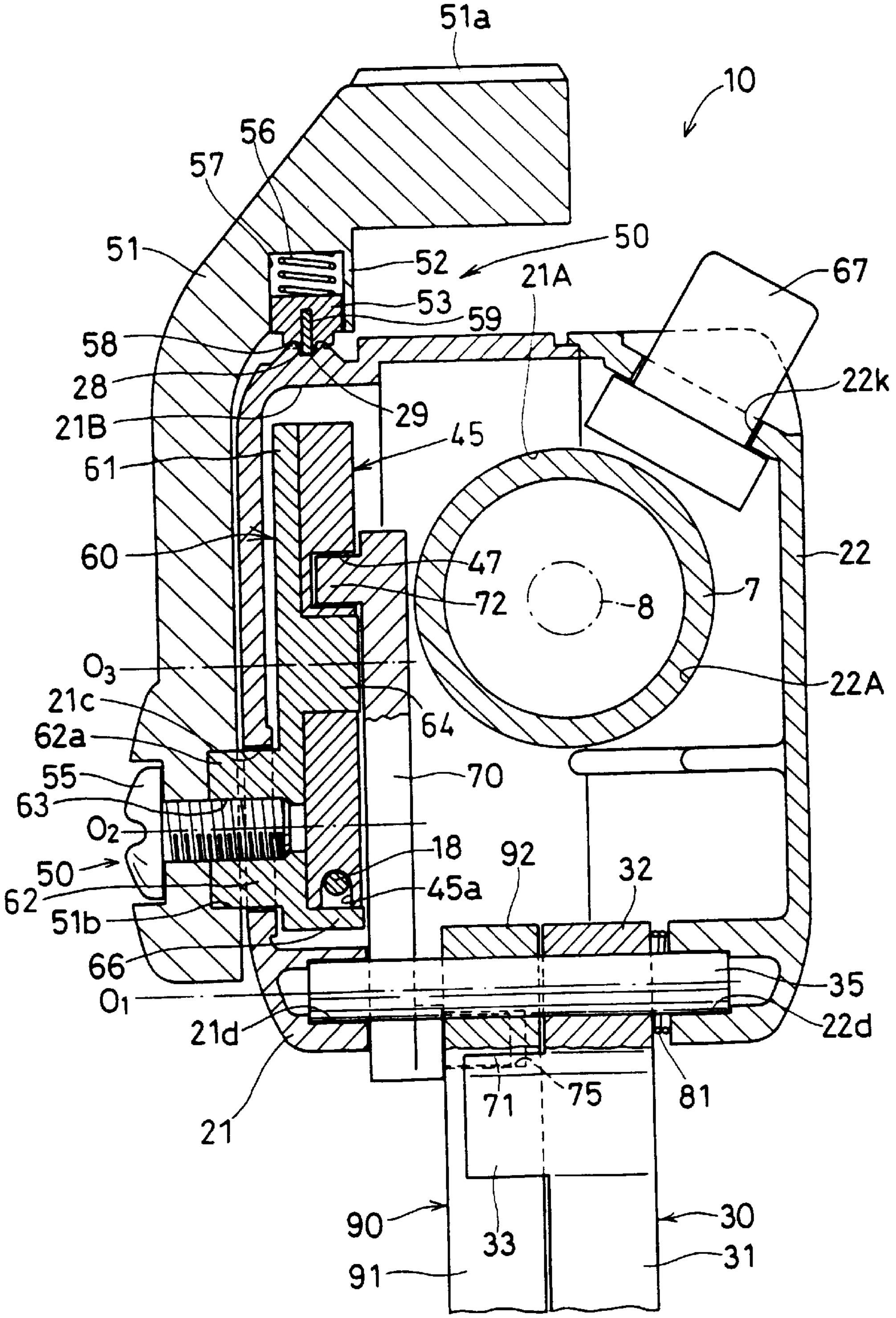
FIG. 6 is a cross-sectional view taken along the line VI—VI in FIG. 5.
Figure 7:
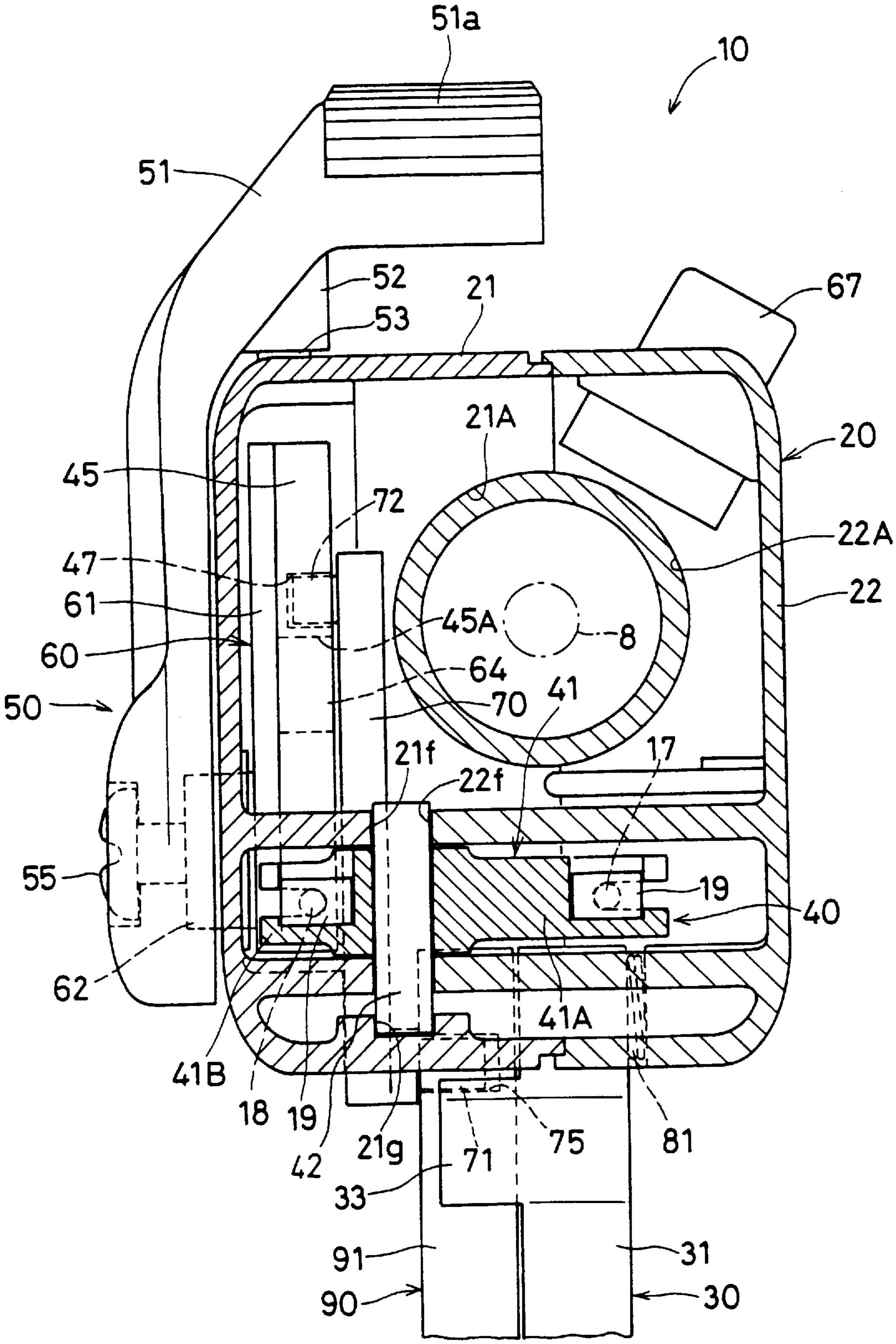
FIG. 7 is a cross-sectional view taken along the line VII—VII in FIG. 5.

The case member 20 is of a two-piece structure, consisting of a plastic right cover case 21 and a plastic left cover case 22. The right cover case 21 and left cover case 22 are, respectively, constructed to have a roughly square dish-like external appearance, both ends of which are provided respectively with a semi-circular cross-sectional contacting face 21A or 22A (see FIGS. 6 and 7). The right cover case 21 and left cover case 22 are fixed to each other face to face by means of screws 24 and 25 which are to be screwed into four tapped holes, i.e., two at the upper portion and two at the lower portion of these cases 21 and 22, with these semi-circular cross-sectional contacting faces 21A and 22A being engaged with the outer circumferential surface of the bar handle 7 so as to hold the bar handle 7 between them (FIGS. 6 and 7). FIGS. 6 and 7 also show the drive shaft 8 which is received in the bar handle 7.

The main lever 30, which is pivotally secured to the case member 20, is formed of a plastic material and, as clearly seen in FIGS. 5 to 8, is composed of a slightly angled manipulating segment 31, which can be pivotally manipulated with the operator's finger so as to bring it close to a lever-receiving portion 11*a* formed on the bottom side of the rear grip portion 11, a boss segment 32 arranged to be rotatably received over a supporting shaft 35, a lifting segment 33 protruding from the right side (accelerating subsidiary lever 90 side) of the boss segment 32 and arranged to lift the accelerating subsidiary lever 90 upward conjointly with the pivotal movement of the main lever 30, and a protruding engaging portion 34 which is adapted to contact with a stopper 83 (see FIG. 5) attached to the case member 20 for limiting the downwardmost position of the main lever 30 when the main lever 30 is released from the operator's finger.

The right end portion of the supporting shaft 35 which is received in the boss segment 32 of the main lever 30 is fittingly inserted into the hole 21*d* formed in the vicinity of the rear lower corner portion of the right cover case 21, and the left end portion of the supporting shaft 35 is fittingly inserted into the hole 22*d* formed in the left cover case 22. Accordingly, the main lever 30 is adapted to be pivotally manipulated about a first rotational axis O1 (FIG. 6) that coincides with the axis of the supporting shaft 35.

On the right side of the boss segment 32 of the main lever 30, there is closely disposed a boss segment 92 of the accelerating subsidiary lever 90, which is rotatably received on a portion of the supporting shaft 35. The accelerating subsidiary lever 90 comprises a slightly curved manipulating segment 91 having a length which is not more than about half that of the main lever 30. The manipulating segment 91 is arranged so as to be ridden on the lifting segment 33 so that when the main lever 30 is pivoted up to the set position S or close to the rear grip portion 11, the manipulating segment 91 is pushed up by the lifting segment 33, thus causing the manipulating segment 91 to pivot about the first rotational axis O1 and to approach the rear grip portion 11, being shifted from the dot-and-dash line position to the solid line position in FIG. 9, i.e., pivoted by an angle of alpha ($\alpha$). The accelerating subsidiary lever 90 can be further pivoted from the pivoted position (interlocked position) by means of the operator's right hand forefinger for instance toward the set position S in the vicinity of the rear grip portion 11, being shifted from the solid line position to the phantom line position in FIG. 10, i.e., pivoted by an angle of gamma ($\gamma$).

On the left side of the main lever 30, a torsion coil spring 81 is externally and loosely fitted on the supporting shaft 35. The torsion coil spring 81 functions to urge upward the manipulating segment 31 of the main lever 30 so as to prevent the main lever 30 from falling downward due to its dead weight as the accelerating subsidiary lever 90 is further pivoted from the aforementioned interlocked position toward the set position S. One end (the manipulating segment 31 side) of the torsion coil spring 81 is engaged with the bottom side of a stud 82 that protrudes from the left side of the manipulating segment 31, and the other end thereof is engaged with the bottom side of the stopper 83.

According to the embodiment, the throttle cable 17 is arranged to be pulled up through a drawing magnitude-enlarging mechanism 40 (to be described hereinafter) and a pulley 45 functioning as a returning member by the pivotal manipulation of the main lever 30 and accelerating subsidiary lever 90.

Figure 8:
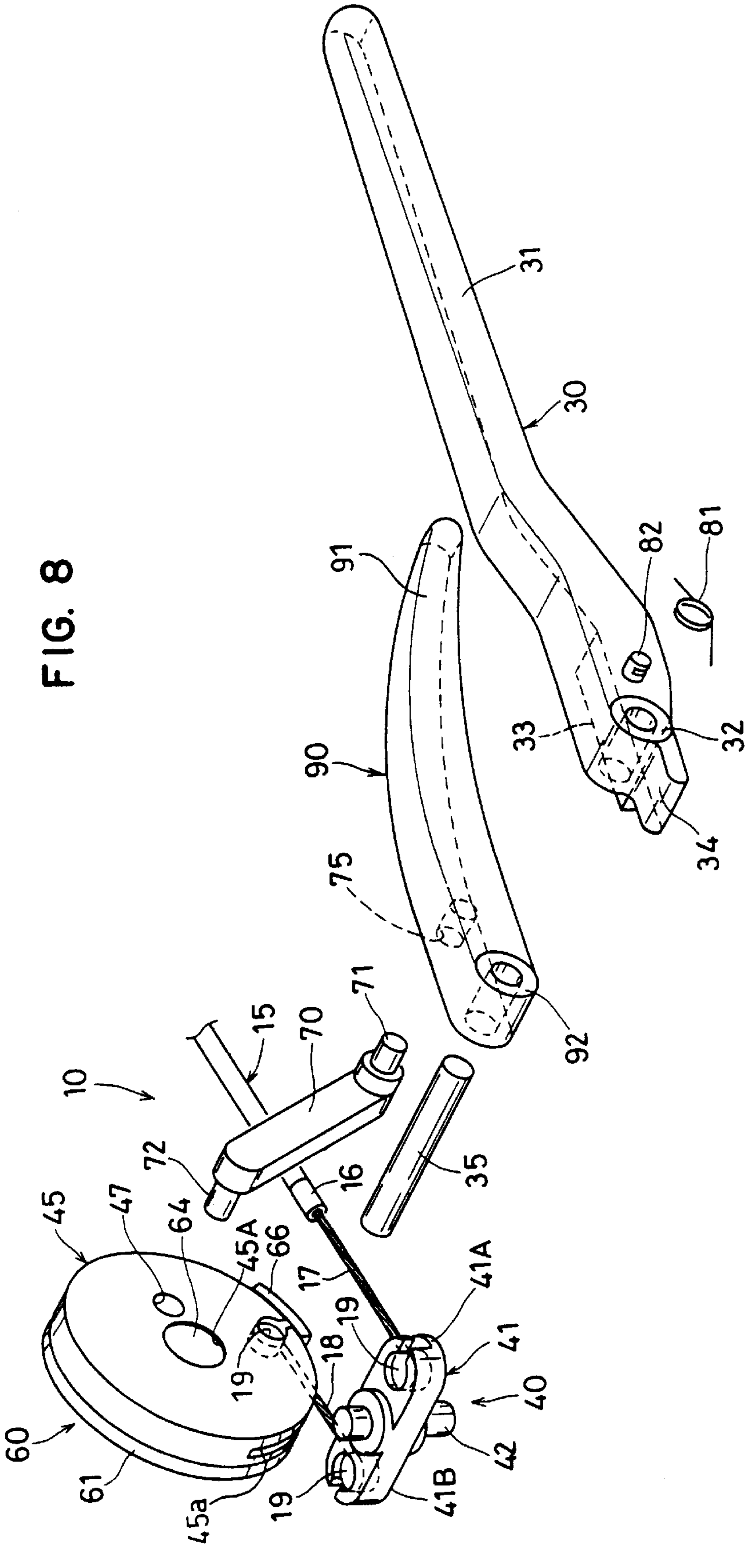
FIG. 8 is a schematic exploded perspective view illustrating the main lever, accelerating subsidiary lever and portions related to these levers of a hand lever device according to one embodiment of the present invention.

As clearly seen from FIGS. 7 and 8, the drawing magnitude-enlarging mechanism 40 is composed of a lever 41, which is externally and rotatably fitted on a shaft 42, the lower end of which is received by a supporting recess 21*g* formed in the lower fore-end portion of the right cover case 21 and the upper end of which is supported by a shaft-supporting portion 21*f* formed in the vicinity of the central portion of the right cover case 21 and by a shaft-supporting portion 22*f* formed in the left cover case 22. The lever 41 is constructed such that an end fitting 19 attached to the distal end of the throttle cable 17 fits into the distal end portion of a longer arm portion 41A of the lever 41. The distal end of the outer tube 16 of the Bowden cable 15 is engaged with a fastening protrusion 22*i* formed on the left cover case 22 (FIG. 5), and the distal end portion of the throttle cable 17 that extends out from the fastening protrusion 22*i* is linked with the distal end portion of the long arm portion 41A.

A pair of end fittings 19 attached to both ends of a short cable 18 are fitted in and engaged with the distal end portion (right end portion) of the shorter arm portion 41B of the lever 41 and with the pulley 45, respectively, so that the distal end portion of the shorter arm 41B of the lever 41 and the pulley 45 are linked with each other via the short cable 18.

The pulley 45 is formed of a plastic material, and as clearly seen from FIGS. 5 to 8, is provided at the center thereof with a bearing bore 45A into which a shaft portion 64 of a lever piece shaft 60 is pivotally received, thus enabling the pulley 45 to rotate about a third rotational axis O3 (FIG. 6) coinciding with the axis of the shaft portion 64. Further, the pulley 45 is provided on the outer surface thereof with a circular hole 47 into which a projected pushing portion 72 of a linking member 70 is pivotally received, as described hereinafter, and also provided on the outer circumferential surface thereof with a retaining hole 48 for retaining the end fitting 19 on the short cable 18 and with a guiding groove 45*a* for guiding the short cable 18.

Additionally, according to the embodiment, a position-adjusting mechanism 50 is provided for forcibly shifting the pulley 45 in a direction (the rearward direction) to pull the throttle cable 17, the shifted pulley 45 being stationarily retained at a desired position. As clearly seen from FIGS. 4 and 6, the position-adjusting mechanism 50 is provided with a sub-lever 51, which is made from a synthetic resin and arranged to pivot along the rear portion of the right cover case 21. The sub-lever 51 is arranged to rotate about a second rotational axis O2 (FIG. 6) and, as explained hereinafter, to be stationarily retained at a desired rotationally manipulated position. To the sub-lever 51 is integrally fixed the plastic lever piece shaft 60 that rotatably supports the pulley 45.

The lever piece shaft 60 is composed of a disk-like member 61 movably housed in a housing segment 21B of the right case cover 21 (FIG. 5), a shaft segment 64 that projects coaxially from the left side of the disk-like member 61 and is rotatably received in the bearing bore 45A of the pulley 45, a semi-circular cable cover flange portion 66 for preventing the short cable 18 from being disengaged from the guiding groove 45*a* of the pulley 45, and a bearing segment 62 which projects from the right side of the lower circumferential portion of the disk-like member 61.

The bearing segment 62 is rotatably received in a bearing bore 21*c* formed in the right cover case 21 and is provided on the distal end portion thereof with a link-fixing portion 62*a* having a non-circular cross-section (e.g., a parallel chamfered configuration). The link-fixing portion 62*a* is arranged to be fitted in a recessed portion 51*b* formed in the proximal end portion of the sub-lever 51. A connecting screw 55 is screwed into a tapped hole 63 formed at the central portion of the bearing segment 62 from the right side of the proximal end portion of the sub-lever 51, thereby fixedly connecting the lever piece shaft 60 with the sub-lever 51 while enabling the lever piece shaft 60 and the sub-lever 51 to be conjointly pivoted about the second rotational axis O2.

The third rotational axis O3 constituting the rotational axis of the pulley 45 is off-set upwardly by a predetermined distance relative to the second rotational axis O2 constituting a common rotational axis of the sub-lever 51 and lever piece shaft 60, so that when the sub-lever 51 is rotatably pulled from the initial position (the position shown in FIGS. 1 to 5) toward the rear side (the rear grip 11 side), the pulley 45 is caused to move in a direction to pull the short cable 18 as explained hereinafter.

On the other hand, the first rotational axis O1 and the second rotational axis O2 are arranged to lie on a common straight line (vertical line), so that if the main lever 30 and the sub-lever 51 are in the initial position, the third rotational axis O3 is rendered able to take a position which is obliquely upward (fore side) relative to the first rotational axis O1 and the second rotational axis O2.

The sub-lever 51 is provided at an upper portion thereof with an anti-slipping corrugated portion 51*a,* and also provided with a housing 52 which is located on the lower and inner right side relative to the anti-slipping corrugated portion $51a$. In the housing 52, a slidable engaging member 53 is slidably fitted (slidable in the elevational direction), and a coil spring 56 for urging the slidable engaging member 53 downwardly is also housed.

As clearly shown in FIGS. 3 and 4 in addition to FIG. 6, a pair of serrated ribs 28 with a deviation-preventive groove 29 being interposed therebetween are provided on the rear shoulder portion of the right cover case 21 in such a manner that they are curved arcuately with the center at the second rotational axis O2. The slidable engaging member 53 is provided, on the bottom surface thereof, with a pair of moving side ribs 58 arranged to be engaged with the serrated ribs 28, and also with a deviation-preventive plate 59, which is partially embedded in the slidable engaging member 53 with a distal end portion protruding downwardly so as to be slidably engaged with the deviation-preventive groove 29.

With the position-adjusting mechanism 50, which is of a click-stop or detent type and is constructed as described above, when the sub-lever 51 is pulled rearwardly starting from the initial position, the engagement between the serrated ribs 28 and the moving side ribs 58 is temporarily released, and the slidable engaging member 53 is pushed upward against the urging force of the coil spring 56. When the sub-lever 51 is pivoted rearwardly about the second rotational axis O2 in that manner, the pulley 45 is concurrently caused to be shifted in a direction to pull the short cable 18. When the shifting of the sub-lever 51 is stopped at a desired pivoted position under that condition, the serrated ribs 28 engage with the detent ribs 58, thereby retaining the sub-lever 51 in the stationary state at the desired pivoted position.

Additionally, a stopping switch 67 of the push-button type for cutting off the electric current to the ignition plug 5 of the internal combustion engine 2 so as to stop the engine 2 is attached to the central portion of the left shoulder of the left cover case 22.

Further, according to the embodiment, a link member 70 (made of a plastic material for instance) is provided for converting the pivoting movement of the main lever 30 or of the accelerating subsidiary lever 90 into the rotational motion of the pulley 45. The link member 70 is provided at the lower end thereof with a proximal end shaft portion 71, which is to be rotatably accepted in the bearing bore 75 formed in the accelerating subsidiary lever 90. The link member 70 is also provided at the upper end thereof with the projected pushing portion 72 for rotating the pulley 45, the projected pushing portion 72 projecting in a direction opposite to that of the proximal end shaft portion 71. The circular hole 47 to allow the projected pushing portion 72 to be loosely inserted therein is formed in the pulley 45. Therefore, under the condition where the proximal end shaft portion 71 is inserted into the bearing bore 75 of the accelerating subsidiary lever 90 and the projected pushing portion 72 is inserted in the circular hole 47 of the pulley 45, the link member 70 is pivotally supported between the accelerating subsidiary lever 90 and the pulley 45, the link member 70 being allowed to pivot about the proximal end shaft portion 71.

In order to enlarge as much as possible the rotational angle of the pulley 45 by way of the projecting pushing portion 72 of the link member 70, the circular hole 47 formed in the pulley 45 is selected to be positioned at an inner circumferential side of the pulley 45, and hence, the bearing bore 45A of the pulley 45 and the outer diameter of the shaft portion 64 of the lever piece shaft 60 received in the bearing bore 45A are both made relatively small.

When the main lever 30 and the accelerating subsidiary lever 90 (or the manipulating portions 31 and 91) are pivotally manipulated to move toward the rear grip portion 11, the pulley 45 is pivoted about the axis O3 (counterclockwise in FIG. 5) and pulls the shorter arm portion 41B of the lever 41 rearwardly by way of the short cable 18, thereby causing the lever 41 to rotate clockwise (in plan view) and hence, the throttle cable 17 is forwardly drawn out by way of the longer arm portion 41A of the lever 41. Due to the lever ratio of the lever 41, the pulling magnitude of the throttle cable 17 by the main lever 30 is magnified.

Figure 5:
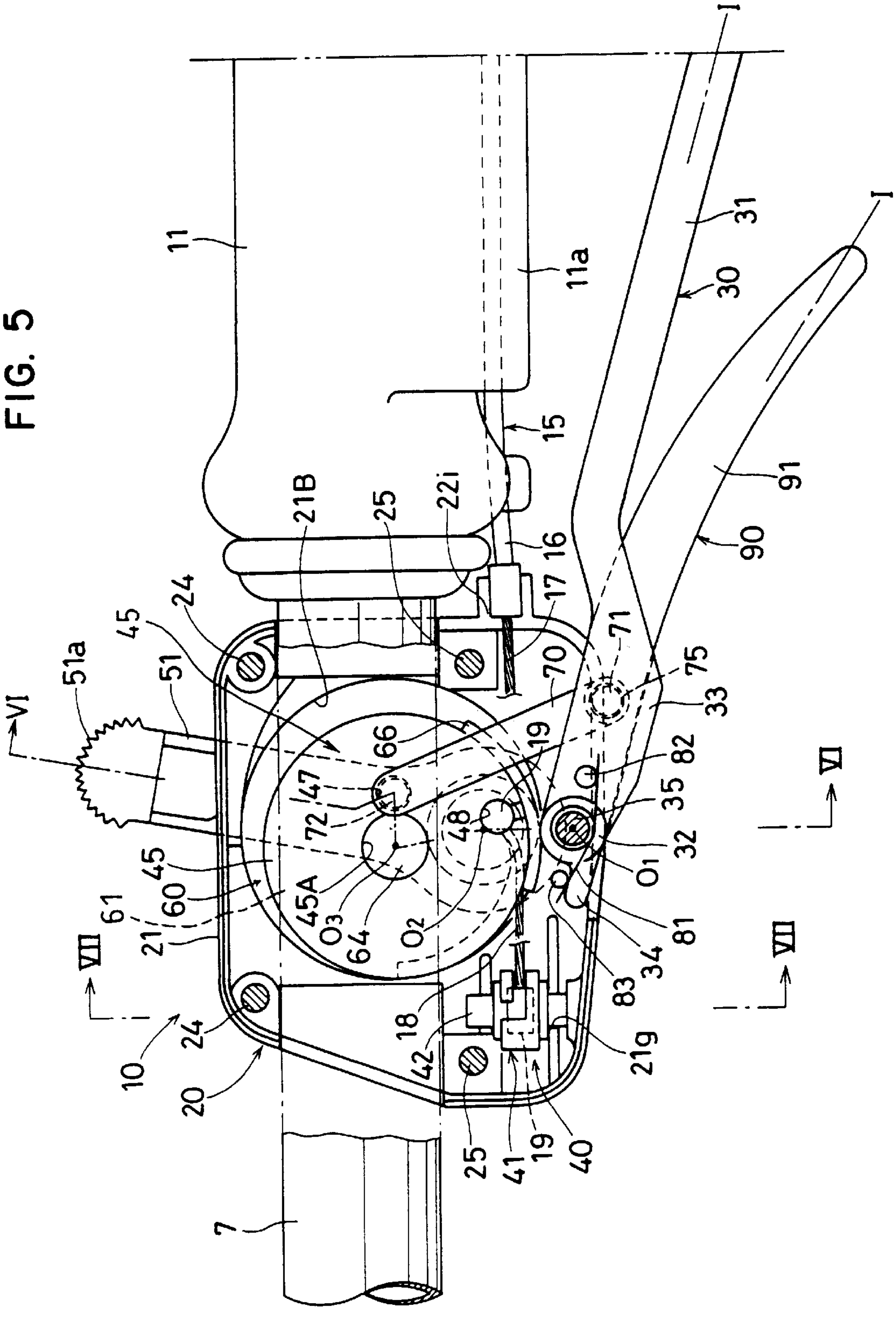
FIG. 5 is a partially cut enlarged left side view showing one embodiment of the hand lever device wherein the left side cover case is dismounted to show the interior of the device.
Figure 9:
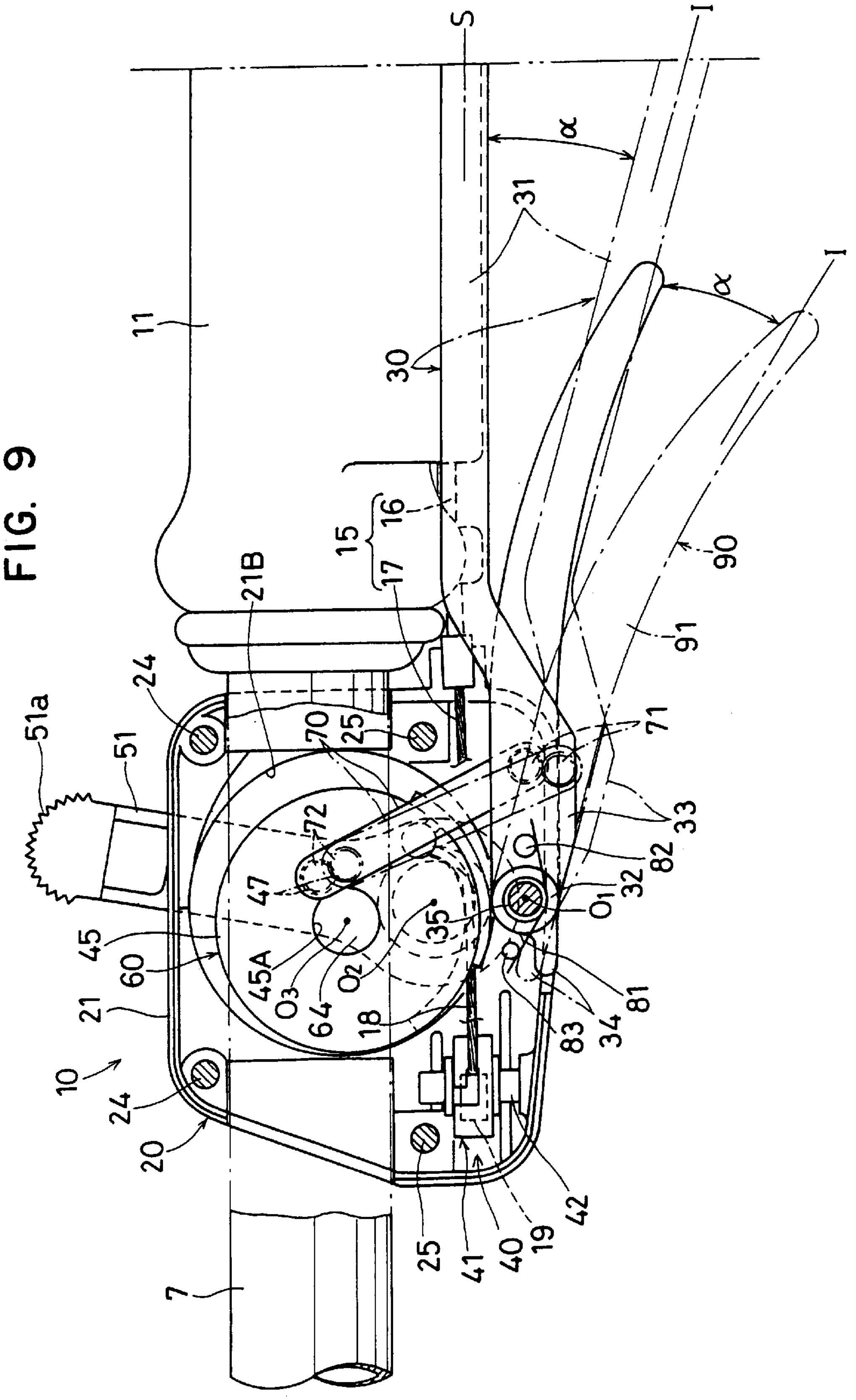
FIG. 9 is a partially cut enlarged left side view of the hand lever device representing one embodiment of the present invention for explaining the movement of the hand lever device, wherein the left side cover case thereof is dismounted for illustrating a set state of the device.

With the hand lever device 10 of the embodiment which is constructed as explained above, when the main lever 30 is pivotally manipulated by a predetermined angle (a set angle "$\alpha$") starting from the opened position I indicated by a phantom line in FIG. 9 (the same as the position which is indicated by a solid line in FIG. 5) up to the set position S in the vicinity of the grip portion 11 of the handle 7, the pulley 45 is caused to rotate counterclockwise about the third rotational axis O3 by way of the projected pushing portion 72 of the link member 70, the magnitude of the rotation being proportional with the set angle "$\alpha$". As a result, the throttle cable 17 is pulled to a predetermined extent via the drawing magnitude-enlarging mechanism 40 employing the lever 41, via the short cable 18, and via the pulley 45 constituting the returning member, thus eliminating the play or slack in the throttle cable 17.

Figure 10:
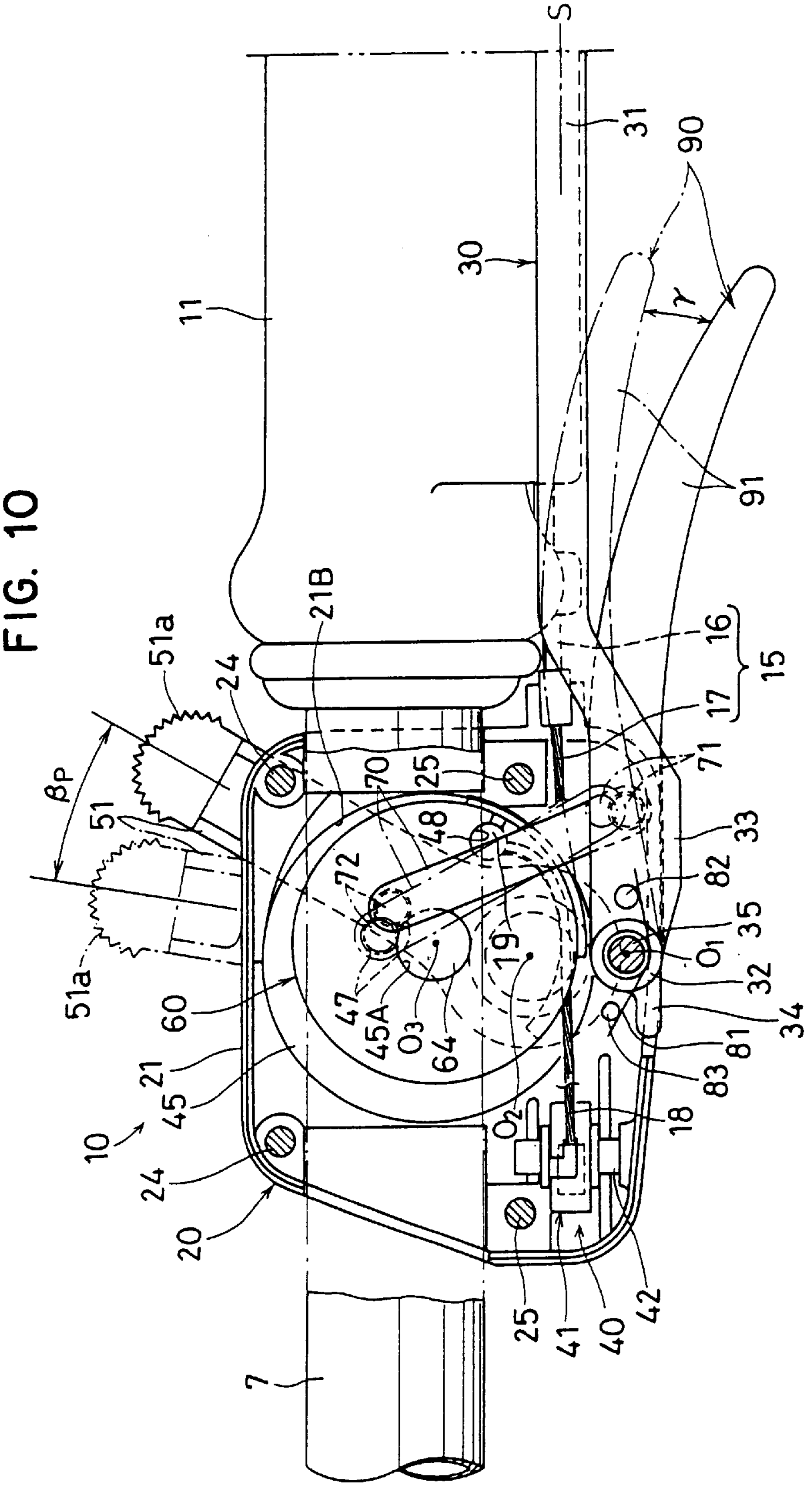
FIG. 10 is a partially cut enlarged left side view of the hand lever device representing one embodiment of the present invention for explaining the movement of the hand lever device, wherein the left side cover case thereof is dismounted for illustrating a state on the occasion of working the device.

Thereafter, when the sub-lever 51 is pulled rearward by a desired pivoting angle $\beta p$ as shown in FIG. 10 while the main lever 30 is being retained manually at the set position S or the throttle cable 17 is being pulled to a sufficient extent to eliminate the play thereof, since the main lever 30 is being retained at the set position S as mentioned above, the center (the third rotational axis O3) is caused to pivotally shift rearward, together with sub-lever 51 and the lever piece shaft 60, about the second rotational axis O2.

As a result, the throttle cable 17 is further pulled to a predetermined extent via the drawing magnitude-enlarging mechanism 40 employing the lever 41, via the short cable 18, and via the pulley 45 constituting the returning member, thus causing the carburetor throttle valve CV to further open from the minimum opening degree (idling opening degree) so as to adjust the opening degree.

Thereafter, even if the sub-lever 51 is released free from the operator's finger, the sub-lever 51 can be retained in an immobilized state at the pivoted position due to the engagement between the serrated ribs 28 and the detent ribs 58, thereby enabling the carburetor throttle valve CV to be held at the adjusted opening degree (a set opening degree).

If the engine speed of the internal combustion engine 2 is to be considerably decreased immediately after the occurrence of an unexpected situation under the condition where the opening degree of the carburetor throttle valve CV is adjusted as mentioned above, the main lever 30 can be released from the operator's finger. As a result, since the throttle cable 17 is normally urged in the direction to close the carburetor throttle valve CV, the main lever 30 and the lever 41 are pulled in the direction opposite to the previous direction, thereby causing the pulley 45 to rotate clockwise by almost the same angle as the previous angle, thus allowing the throttle cable 17 to return to the previous un-manipulated state. As a result, the carburetor throttle valve CV is also allowed to return to the idling opening degree, thereby allowing the internal combustion engine 2 to assume the idling state.

If the working device 1 is of the type where the power transmission from the internal combustion engine 2 to the working member 3 (such as a cutting blade) is to be effected through a centrifugal clutch, the centrifugal clutch can be immediately turned into a cut-off state, thus suspending the power transmission of the engine 2 to the working member 3 and hence, immediately stopping the working member 3 (such as a cutting blade).

When the main lever 30 is pivotally moved again toward the set position S after the main lever 30 has been once released as mentioned above, the play of the throttle cable 17 is taken up, and moreover, since the sub-lever 51 included in the position-adjusting mechanism 50 is retained at the previously manipulated position, the carburetor throttle valve CV can be returned to the previous opening degree which has been set prior to the release of the main lever 30, thus making it possible to dispense with the readjustment of the sub-lever 51.

With the hand lever device 10 of the embodiment, various advantages can be obtained. Namely, the opening degree of the carburetor throttle valve CV can be easily adjusted and maintained to a desired opening degree via the cables 17 and 18, and also can be quickly returned to the minimum opening degree (idling opening degree), thus assuring a high operational safety and minimizing the weariness of the operator's finger. Additionally, it is possible to dispense with the readjustment of the throttle lever at the occasion of returning the carburetor throttle valve CV to the previous opening degree.

When the main lever 30 is pivotally moved to the set position S after the carburetor throttle valve CV has been once returned to the idling opening degree by releasing the main lever 30 during the operation of a working machine such as a bush-cutting operation with the engine being set to a partial engine speed region, i.e., the main lever 30 being moved to the set position S and the sub-lever 51 being maintained at an intermediate opening degree (adjusted opening degree), the carburetor throttle valve CV can be returned to the previous adjusted opening degree. However, it takes a relatively long time for attaining the previous engine speed (pre-set engine speed), once the main lever 30 is returned to the idling opening degree as mentioned above. In order to solve that problem, the hand lever device 10 according to the embodiment is arranged such that concurrently with the manipulation of the main lever 30 to return it to the previous set position S, the accelerating subsidiary lever 90 that has been rotated together with the rotation (pivoting) of the main lever 30 is further rotated up to the set position S or close to the rear grip portion 11 (by grasping the accelerating subsidiary lever 90 so as to lift it) as shown by a phantom line in FIG. 10.

As a result, the throttle cable 17 is further pulled via the pulley 45, thereby causing the opening degree of the carburetor throttle valve CV to become further enlarged as compared with the degree of opening that provides a pre-set engine speed, and due to the enlarged opening degree of the carburetor throttle valve CV, the engine speed can be quickly increased. Subsequently, the accelerating subsidiary lever 90 is released from the operator's finger, thereby allowing the accelerating subsidiary lever 90 to return to the initial position which has been pre-set before the manipulation thereof, since the throttle cable 17 is always urged in the direction to close the carburetor throttle valve CV. As a result, the increased engine speed can be returned, within a very short period of time, to the ordinary engine speed corresponding to the adjusted opening degree of the sub-lever 51, the ordinary engine speed being maintained thereafter.

As explained above, due to the provision of the accelerating subsidiary lever 90, the responsiveness in terms of rapid acceleration of the engine 2 as well as the manipulativity of the hand lever device 10 is significantly improved.

Figure 11:
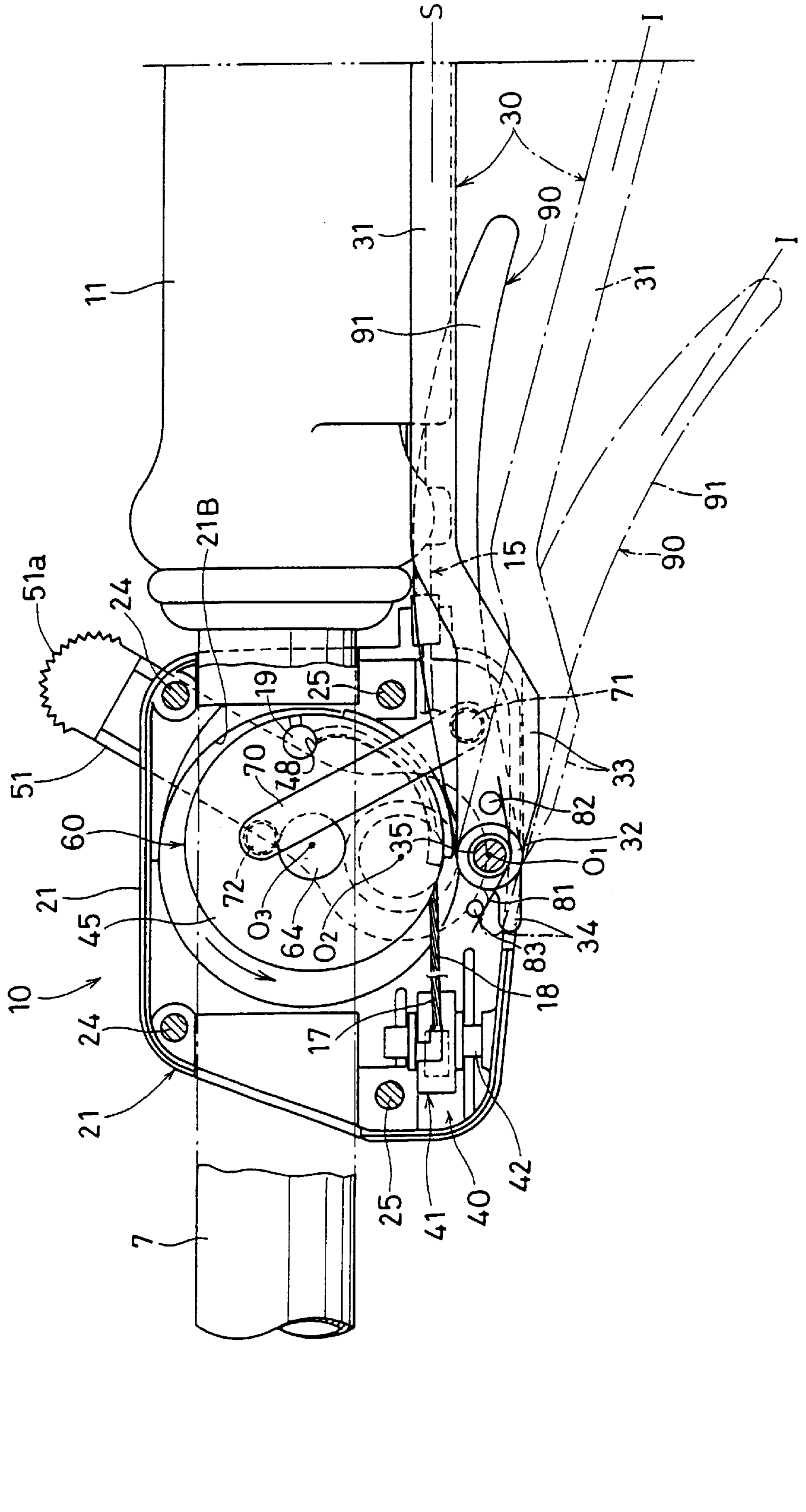
FIG. 11 is a partially cut enlarged left side view of the hand lever device representing one embodiment of the present invention for explaining the movement of the hand lever device, wherein the left side cover case thereof is dismounted for illustrating a state on the occasion where the main lever and accelerating subsidiary lever are both pivotally moved to the set position.

Also, when the cutting blade 13 of the bush cutter 1 is entangled with a weed or encounters an area of dense or thick weeds during the operation of the bush cutter 1 with the engine speed thereof being adjusted to a partial engine speed region, the load on the engine 2 is greatly increased, thereby greatly decreasing the engine speed, thus slowing the cutting work. In such a case also, as shown by the solid line in FIG. 11, with the main lever 30 being kept retained at the previous set position 3, the accelerating subsidiary lever 90 is further rotated up to the set position S or close to the rear grip portion 11 (by grasping the accelerating subsidiary lever 90 so as to lift it). As a result, the throttle cable 17 is further pulled, thereby causing the opening degree of the carburetor throttle valve CV to become further enlarged, and due to the enlarged opening degree of the carburetor throttle valve CV, the engine speed (torque) can be quickly increased, thus making it possible to smoothly proceed with the bush-cutting operation. When the cutting blade 13 is released from the aforementioned entanglement with a weed or an area of dense or thick weeds, the accelerating subsidiary lever 90 can be released from the operator's finger, thereby allowing the accelerating subsidiary lever 90 to return to the initial position which has been pre-set before the manipulation thereof, and hence allowing the increased engine speed to immediately return to the ordinary engine speed corresponding to the adjusted opening degree of the sub-lever 51, the ordinary engine speed being maintained thereafter.

As explained above, due to the provision of the accelerating subsidiary lever 90 in the device of the embodiment, the engine speed can be quickly increased by way of simple manipulation even if the engine speed is caused to be temporarily decreased.

Figure 12:
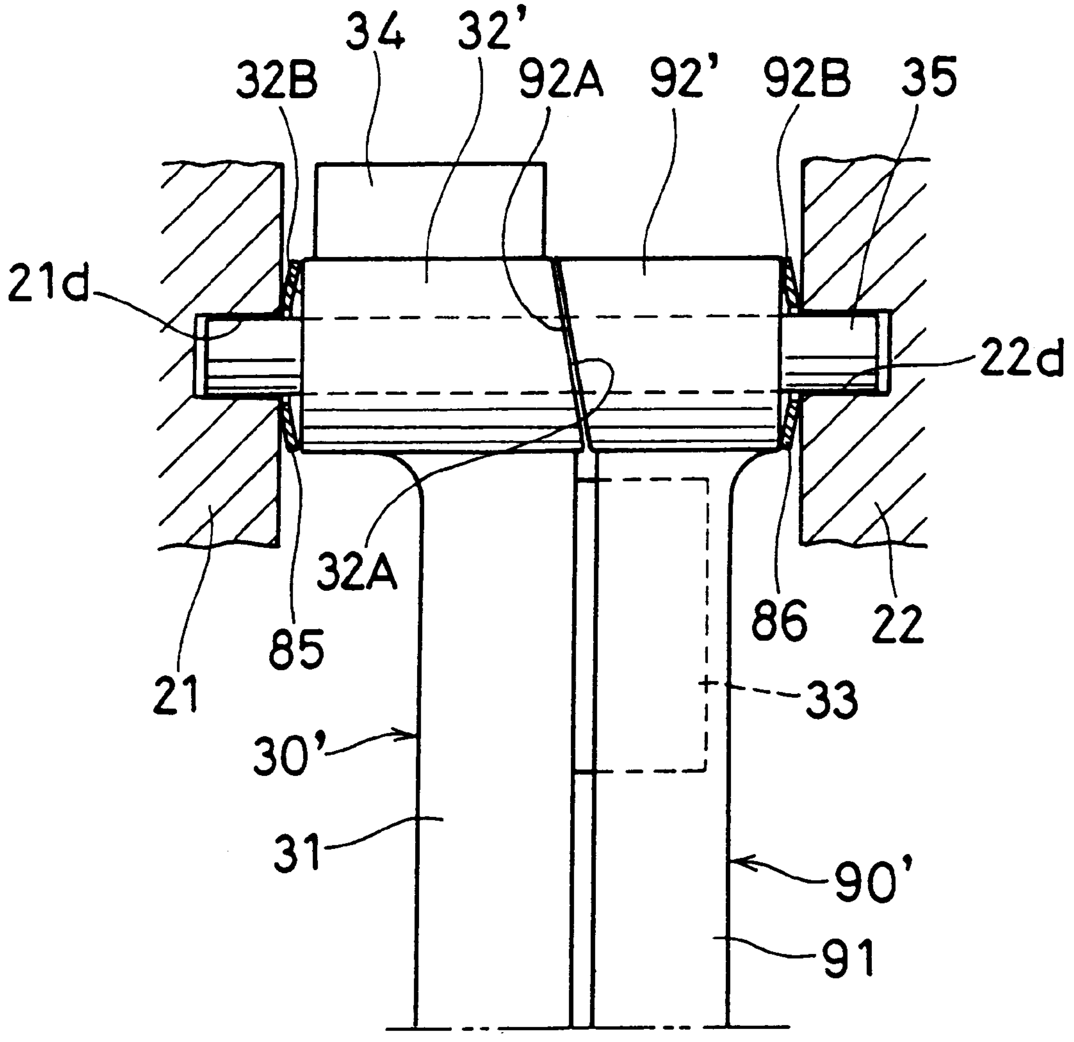
FIG. 12 is a partially sectioned plan view of the main lever 30', accelerating subsidiary lever 90' and portions related to these levers according to a modification of one embodiment of the present invention.

FIG. 12 shows the main lever 30', the accelerating subsidiary lever 90' and the portions related to these levers of a modification of the embodiment of the hand lever device 10 of the present invention. In FIG. 12, the same structures as those of FIGS. 1 to 11 are indicated by the same reference numerals, and a detailed explanation thereof at this point is omitted in view of the above description.

According to the modification of the embodiment, when the accelerating subsidiary lever 90' is pivoted up to the set position S, the accelerating subsidiary lever 90' can be locked (a partial lock) with the cables 17 and 18 being pulled to a predetermined extent, and the locked state can be unlocked by pivoting the main lever 30 up to the set position S.

More specifically, an inner end face of the boss portion 32' of the main lever 30' is contacted with the inner end face of the boss portion 92' of the accelerating subsidiary lever 90', these inner end faces being respectively constituted by a cam face 32A or 92A. Accordingly, when the accelerating subsidiary lever 90' is pivoted up to the set position S, the boss portion 32' or 92' thereof is respectively caused to shift outward, thereby causing the outer end faces 32B and 92B to be press-contacted, via the spring washers 85 and 86, with case members 21 and 22, respectively, thus giving rise to a frictional force between the aforementioned outer end faces 32B and 92B and the case members 21 and 22. Due to the frictional force, the accelerating subsidiary lever 90' is clamped and allowed to take the aforementioned locked state.

As explained above, since the hand lever device 10 is provided with the partial lock property that can be effected through the pivotal manipulation of the accelerating subsidiary lever 90', the start up ability of the engine 2 can be improved.

While in the foregoing one embodiment of the present invention has been explained in detail for the purpose of illustration, it will be understood that the construction of the device can be varied without departing from the spirit and scope of the invention.

For example, a non-circular plate may be employed as a returning member in place of the pulley 45. The present invention can be applied to various kinds of hand lever devices as shown for example in Japanese Patent Unexamined Publication H10-35318.

As for the drawing magnitude-enlarging mechanism, a gear wheel as shown for example in Japanese Patent Unexamined Publication H10-35318 can be employed in place of the aforementioned construction employing the lever 41.

In the aforementioned embodiments, the hand lever device 10 is employed for adjusting the opening degree of the carburetor throttle valve CV of the internal combustion engine 2. However, the hand lever device of the present invention can be of course utilized for various end-uses other than the adjustment of the opening degree of the carburetor throttle valve CV.

Further, the hand lever device 10 can be attached not only to the bar handle 7, but also to a U-shaped handle, etc.

As described above, it is possible, with the handle lever device of the present invention, to enable the opening degree of the driven member such as a carburetor throttle valve to be easily adjusted and maintained to a desired opening degree via the cable, and also to be quickly returned to the minimum opening degree (idling opening degree), thus assuring a high operational safety and minimizing the weariness of the operator's finger. Additionally, it is also possible, according to the handle lever device of the present invention, to dispense with the readjustment of the throttle lever at the occasion of returning the carburetor throttle valve to the previous opening degree. Moreover, it is possible to improve the responsiveness and accelerativity of hand lever devices, and at the same time, to enable the engine speed to be quickly increased by way of simple manipulation.

What is claimed is:

1. A hand lever device for operating a driven member, comprising;

a main lever arranged to be pivotally manipulated about a first rotational axis;

a sub-lever arranged to be pivotally manipulated about a second rotational axis and retained in a stationary state at a predetermined pivoted position;

a returning member adapted to be rotated about a third rotational axis;

a cable adapted to be coupled at one end to the driven member and linked at the other end with the main lever and with the returning member, the cable being arranged to be pulled by a pivotal manipulation of the main lever to a set position to thereby rotate the returning member about the third rotational axis and also arranged to be further pulled from the above-mentioned pulled state by a pivotal manipulation of the sub-lever to further rotate the returning member about the third rotational axis to a selected position; and an accelerating subsidiary lever which is adapted to be pivotally manipulated about the first rotational axis so as to further pull, via the returning member, the cable under a condition where the main lever is pivotally moved to the set position and the sub-lever is retained at the selected position.

2. The hand lever device according to claim 1, wherein the main lever and subsidiary lever are configured such that the accelerating subsidiary lever is pivoted together with the pivoting of the main lever to the set position.

3. The hand lever device according to claim 1, wherein the accelerating subsidiary lever and main lever are constructed such that when the accelerating subsidiary lever is pivoted up to the set position, the accelerating subsidiary lever can be locked with the cable being pulled to a predetermined extent, and when the main lever is pivoted up to the set position under the condition where the accelerating subsidiary lever is in the locked state, the locked state is unlocked by the pivoting of the main lever.

4. The hand lever device according to claim 2, wherein the accelerating subsidiary lever and main lever are constructed such that when the accelerating subsidiary lever is pivoted up to the set position, the accelerating subsidiary lever can be locked with the cable being pulled to a predetermined extent, and when the main lever is pivoted up to the set position under the condition where the accelerating subsidiary lever is in the locked state, the locked state is unlocked by the pivoting of the main lever.

5. The hand lever device according to claim 3, wherein the accelerating subsidiary lever and main lever have boss portions having inner end faces that contact each other and outer end faces contacting a case member, wherein at least one of the inner end faces is provided with a cam surface, and wherein when the accelerating subsidiary lever is pivoted up to the set position, the boss portions thereof are caused by the cam surface to shift outwardly, thereby causing the outer end faces to be pressed against the case member so as to produce a frictional force between the outer end face and the case member and achieving a locked state of the hand lever device.

6. The hand lever device according to claim 4, wherein the accelerating subsidiary lever and main lever have boss portions having inner end faces that contact each other and outer end faces contacting a case member, wherein at least one of the inner end faces is provided with a cam surface, and wherein when the accelerating subsidiary lever is pivoted up to the set position, the boss portions thereof are caused by the cam surface to shift outwardly, thereby causing the outer end faces to be pressed against the case member so as to produce a frictional force between the outer end face and the case member and achieving a locked state of the hand lever device.

7. The hand lever device according to any one of claims 1, 2, 3, 4, 5, and 6, wherein the driven member is a carburetor throttle valve of an internal combustion engine.

* * * * *